(12) United States Patent
Fathi

(10) Patent No.: US 7,008,175 B2
(45) Date of Patent: Mar. 7, 2006

(54) RADIATOR COOLING FAN REPLACEMENT TO INCREASE ENGINE EFFICIENCY

(76) Inventor: Saied Fathi, 4 Rivermead, Avon, CT (US) 06001

( * ) Notice: Subject to any disclaimer, the term of this patent is extended or adjusted under 35 U.S.C. 154(b) by 74 days.

(21) Appl. No.: 10/851,234

(22) Filed: May 24, 2004

(65) Prior Publication Data

US 2005/0002799 A1    Jan. 6, 2005

Related U.S. Application Data

(60) Provisional application No. 60/474,918, filed on Jun. 3, 2003.

(51) Int. Cl.
  *F01D 1/06*    (2006.01)
(52) U.S. Cl. .......................... 415/83; 415/177
(58) Field of Classification Search ................ 415/83, 415/84, 177, 178, 170
  See application file for complete search history.

(56) References Cited

U.S. PATENT DOCUMENTS

| | | | | |
|---|---|---|---|---|
| 1,793,903 | A | * | 2/1931 | Burgess ................ 415/84 |
| 2,078,499 | A | * | 4/1937 | Frederik ............... 123/41.42 |
| 2,099,785 | A | | 11/1937 | Willgoos |
| 2,839,038 | A | | 6/1958 | Middlebrooks, Jr. |
| 3,203,499 | A | * | 8/1965 | Bentz et al. ........... 180/68.4 |
| 3,827,523 | A | * | 8/1974 | Williams ............... 165/44 |
| 3,858,644 | A | * | 1/1975 | Beck et al. ............ 415/207 |
| 4,010,613 | A | | 3/1977 | McInerney |
| 4,319,554 | A | | 3/1982 | Buffie |
| 4,846,258 | A | | 7/1989 | Charles |
| 4,907,552 | A | | 3/1990 | Martin |
| 4,918,923 | A | | 4/1990 | Woollenweber et al. |
| 5,787,711 | A | | 8/1998 | Woollenweber et al. |
| 2002/0162318 | A1 | | 11/2002 | Kight |
| 2002/0189255 | A1 | | 12/2002 | Callas et al. |

FOREIGN PATENT DOCUMENTS

| | | |
|---|---|---|
| EP | 0 343 785 A2 | 11/1989 |
| EP | 0 849 447 A1 | 6/1998 |
| GB | 2 147 356 A | 5/1985 |
| GB | 2 154 280 A | 9/1985 |
| JP | 57-046012 | 3/1982 |

* cited by examiner

*Primary Examiner*—Thomas E. Lazo
*Assistant Examiner*—Igor Kershteyn
(74) *Attorney, Agent, or Firm*—Richard C. Litman

(57) ABSTRACT

The radiator cooling fan replacement to increase engine efficiency is a multi-stage centrifugal air pump supercharger that replaces the radiator fan while at the same time increases air density of its output air. The centrifugal air pump comprises a number of radial air chambers. Each air chamber includes a number of rotating blades. The rotating blades apply a centrifugal force to the air increasing the density of the air. The density of the air gradually increases as the air moves from one chamber to the next until it is forced out of the centrifugal air pump to the engine block. Before entering the engine block, the compressed air from the air pump passes through an air filter that cools the air.

2 Claims, 5 Drawing Sheets

RADIATOR COOLING FAN REPLACEMENT TO INCREASE ENGINE EFFICIENCY

CROSS-REFERENCE TO RELATED APPLICATION

This application claims the benefit of U.S. Provisional Patent Application Ser. No. 60/474,918, filed Jun. 3, 2003.

BACKGROUND OF THE INVENTION

1. Field of the Invention

The present invention relates to devices for increasing the density of air intake in internal combustion engines, and more particularly to a multi-stage centrifugal air pump that acts as a replacement for a conventional radiator fan, while at the same time having a high air density output applied to the air intake to effectively operate as a supercharger.

2. Description of the Related Art

Increasing the mass of air into a cylinder of an internal combustion engine will increase its output. By increasing the piston size and its displacement the volume of air will increase. To increase the output at a given volume of air, the density of the charged air must be increased. Air density may be increased by supercharging or turbocharging. Turbochargers use exhaust gas heat pressure to rotate a hot gas turbine, which in turn rotates an air compressor turbine. There are two types of superchargers, axial flow and centrifugal flow. Axial flow superchargers are also know as positive displacement superchargers. Superchargers typically increase the density of air three or four times its original density.

There is a serious drawback to turbochargers in that they are effectively operational at one third of redline round per minute (rpm), which means that it will take time to build up exhaust gas and to rotate the compressor turbine. There is no sizeable increase in air density at low rpm, so there is no increase in output at low rpm. This is referred to as the turbocharging gap. Another drawback is that exit air temperature is relatively higher due to the hot turbine environment. Also, turbochargers require elaborate manufacturing and maintenance that will translate into higher costs to consumers.

Superchargers are driven by a small pulley that is belted to a relatively larger pulley that is in turn attached to a crankshaft of an engine. The pulleys will accelerate the rpm of the supercharger in relation to the rpm of the crankshaft. Both positive displacement and centrifugal superchargers will effectively increase air density at high rpm. Any increase in engine revolution, with no gap, will increase the supercharger revolution but full effectiveness is at high revolution. Superchargers also require high manufacturing and maintenance.

Various engine systems with turbochargers, superchargers and other air cooling devices are known or have been proposed.

U.S. Pat. No. 4,010,613, issued Mar. 8, 1977 to Charles E. McInerney, discloses a turbocharged engine after cooling system. The turbocharged engine air supply cooling arrangement utilizes an air-to-air heat exchanger provided with a fan to circulate ambient air about the heat exchanger to cool the compressor discharge air. The air is cooled to near the temperature of the ambient air as it passes through the heat exchanger. The air is then conveyed through a turbine. As the air passes through the turbine it is cooled to a temperature that is lower than the temperature of the ambient air.

U.S. Pat. No. 4,907,552, issued Mar. 13, 1990 to Chans A. Martin, shows a forced air induction system. The forced air system is provided in an air box of an ATV. A fan is installed in the air box next to an enlarged air inlet. The fan sucks air into the box and pushes air through the air box and through an air filter to a downstream carburetor. The pressurized air produces a boost in power acting as a supercharger for the ATV to increase the horsepower of the ATV.

U.S. Pat. No. 4,918,923, issued Apr. 24, 1990 to William E. Woollenweber et al., teaches an internal combustion engine turbosystem. The invention is an exhaust-driven cooling system for an internal combustion engine that includes a turbocooler having an exhaust-driven turbine and ducted fan means to generate a flow of cooling air for use in an internal combustion engine heat exchanger to dissipate heat loss of the engine. The system also provides a control for the generation of cooling air. The system provides internal combustion engines with reduced temperatures and pressures for its exhaust gas.

U.S. Pat. No. 5,787,711, issued Aug. 4, 1998 to William E. Woollenweber et al., describes a motor-assisted turbo-cooling system for internal combustion engines. The internal combustion cooling system incorporates a motor-assisted turbofan. The turbine driven fan is increased in rotational speed by energizing a motor attached to the turbine fan shaft from an outside power source to provide required cooling air flow. The cooling air system of the invention includes a duct fan for supplying cooling air for one or more heat exchangers and is controlled by a system of sensors.

Other devices are described in U.S. Patent Publication No. 2002/0162318, published Nov. 7, 2002 (bimodal fan, heat exchanger and bypass air supercharging for piston or rotary driven turbine); U.S. Patent Publication No. 2002/0189255, published Dec. 19, 2002 (combined remote first intake air aftercooler and a second fluid from an engine cooler for an engine); U.S. Pat. No. 2,099,785, issued Nov. 23, 1937 to A. V. D. Willgoos (engine intake system); U.S. Pat. No. 2,839,038, issued Jun. 17, 1958 to C. E. Middlebrooks, Jr. (supercharger for internal combustion engine); U.S. Pat. No. 4,319,554, issued Mar. 16, 1982 to A. E. Buffie (fuel system for internal combustion engines); and U.S. Pat. No. 4,846,258, issued Jul. 11, 1989 to H. N. Charles (non-ram cooling system).

Japanese Patent No. 57-46,012, published Mar. 16, 1982, discloses a supercharger cooling device for an engine. The cooling device enhances the filling efficiency of an engine by providing a supercharger, consisting of a compressor arranged in the suction line of the engine, with a rotary radiating member driven by the shaft of the supercharger, which cools the compressor. The turbo-supercharger is composed of a compressor and a turbine. A cooling fan is fixed to the extended end of a shaft to cool a compressor impeller. The supercharger and the radiator are cooled together. Thus the filling efficiency of the engine can be enhanced and the durability of the supercharger improved.

United Kingdom Patent No. 2,147,356, published May 9, 1985, shows supercharging a motor vehicle internal combustion engine. A charge-air compressor for supercharging an engine is driven by a turbine. The turbine is driven by means of air collected by an air scoop during forward movement of the vehicle. Some of the air may be supplied to the engine through a passage that bypasses the carburetor. The turbine cools the air drawn into the engine.

United Kingdom Patent No. 2,154,280, published Sept. 4, 1985, teaches an engine-driven positive displacement supercharger. The supercharger is driven through a belt from a pulley attached to an extension of the engine crankshaft by a free wheel hub. In operation, air enters a rotor through a rotatably adjustable valve. The air charge is expanded to fill the entire workspace and is later re-compressed to a volume matching that of the engine and delivered through an exchanger to the engine cylinders. Fuel may be injected into the air charge before, during or after the supercharger without departing from the desired effects of the invention.

European Patent No. 849,447, published Jun. 24, 1998, describes an arrangement for the indirect cooling of an internal combustion engine or a motor coach. The cooling system has an air-fluid heat exchanger in which the fluid flow is cooled by a forced air flow produced by a fan. The fan is in the form of a centrifugal turbine with its axis of rotation and axial intake lying perpendicular to a first wall, and its centrifugal outlet flow channeled so that it exits tangentially and perpendicular a second wall. Finally, European Patent No. 343,785, published Nov. 11, 1989, teaches a cooling system for an internal combustion engine.

None of the above inventions disclose a device that can increase the density of air at low engine rpm. None of the above inventions and patents, taken either singly or in combination, is seen to describe the instant invention as claimed. Thus, a radiator cooling fan replacement to increase engine efficiency solving the aforementioned problems is desired.

SUMMARY OF THE INVENTION

The present invention is a supercharger that acts as a replacement for a conventional radiator fan and at the same time increases the density of the air flowing from the radiator to the engine block of a vehicle. The present supercharger is a multi-stage centrifugal air pump. The multi-stage centrifugal air pump increases the density of the air at low rpm, while conventional turbo and superchargers only increase the density of air at high rpm.

The multi-stage centrifugal air pump comprises a housing that is disposed around the rotating shaft of the engine block. A plurality of radial air chambers are located inside of the housing. Each of the air chambers are hollow and are connected to the adjacent air chambers by a narrow air passage. An air intake opening is disposed along an outer wall of the housing. The air intake opening allows air from the radiator to enter into the air chambers. The air pump also provides an air outlet for allowing the compressed air to exit the air pump and enter the engine block.

Each of the plurality of air chambers includes a plurality of rotating blades. The rotating blades provide the centrifugal energy that increases the density of the air traveling through the air pump. The air chambers located farthest from the center of the centrifugal air pump contain the most rotating blades. The air chamber located at the center of the air pump contains the least amount of rotating blades. Also, the blades in the air chamber farthest from the center of the air pump rotate at a higher speed than then blades located nearest the center of the air pump. The rotating blades force the air to move through each of the air chambers. The density of the air gradually increases as it moves from chamber to chamber.

The multi-stage centrifugal air pump assembly replaces the radiator fan in a vehicle assembly to increase the density of the air while also cooling the air. The radiator cooling fan replacement assembly comprises a funnel, which is disposed along the output end of the radiator. The funnel has a large input end attached to the radiator and a narrow output end positioned away from the radiator. An air duct is positioned between the funnel and the centrifugal air pump. The air duct transports the air from the radiator in the intake opening of the air pump.

Once the air is compressed in the centrifugal air pump, the air is transported through an air pipe to the air-cooling filter. The air-cooling filter is a typical intercooler with removable and replaceable layers of filtering material inside the filter. The layers of filtering material cool down the incoming air and therefore further increase its density, while at the same time trapping minor particles in the charged air to make the air safer for the engine. After the air passes through the cooling filter it passes through a second air pipe to the engine block.

The assembly further comprises an air valve that is located along the intake opening of the centrifugal air pump. The air valve is a solenoid walled magnetic valve that regulates the amount of air that enters the centrifugal air pump. A second solenoid magnetic valve is disposed along the first air pipe. The second valve acts as a bypass valve that regulates the amount of compressed air that enters into the air cooling filter.

Accordingly, it is a principal object of the invention to provide a device for increasing the output of an internal combustion engine by increasing the density of air in the engine.

It is another object of the invention to provide a device for increasing the density of air in an engine at lower rpm than is available with conventional turbochargers and superchargers.

It is a further object of the invention to provide a device for increasing the air in an engine while simultaneously cooling the air so that the device will also act as a radiator fan replacement.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is a radiator fan cooling replacement that also acts as a supercharger for increasing the output of an internal combustion engine. The output of an engine is increased by increasing the size and the displacement of its pistons, which will increase the volume of air in the engine. To increase the output at a given volume of air, the density of the air must be increased. In other words, the mass of air must be increased at the same volume of air. The supercharger of the preferred embodiments of the present invention is a multi-stage centrifugal air pump that increases the density of the air in an internal combustion engine, while at the same time cooling the air so that the air pump may also act as a radiator fan replacement.

Figure 1:
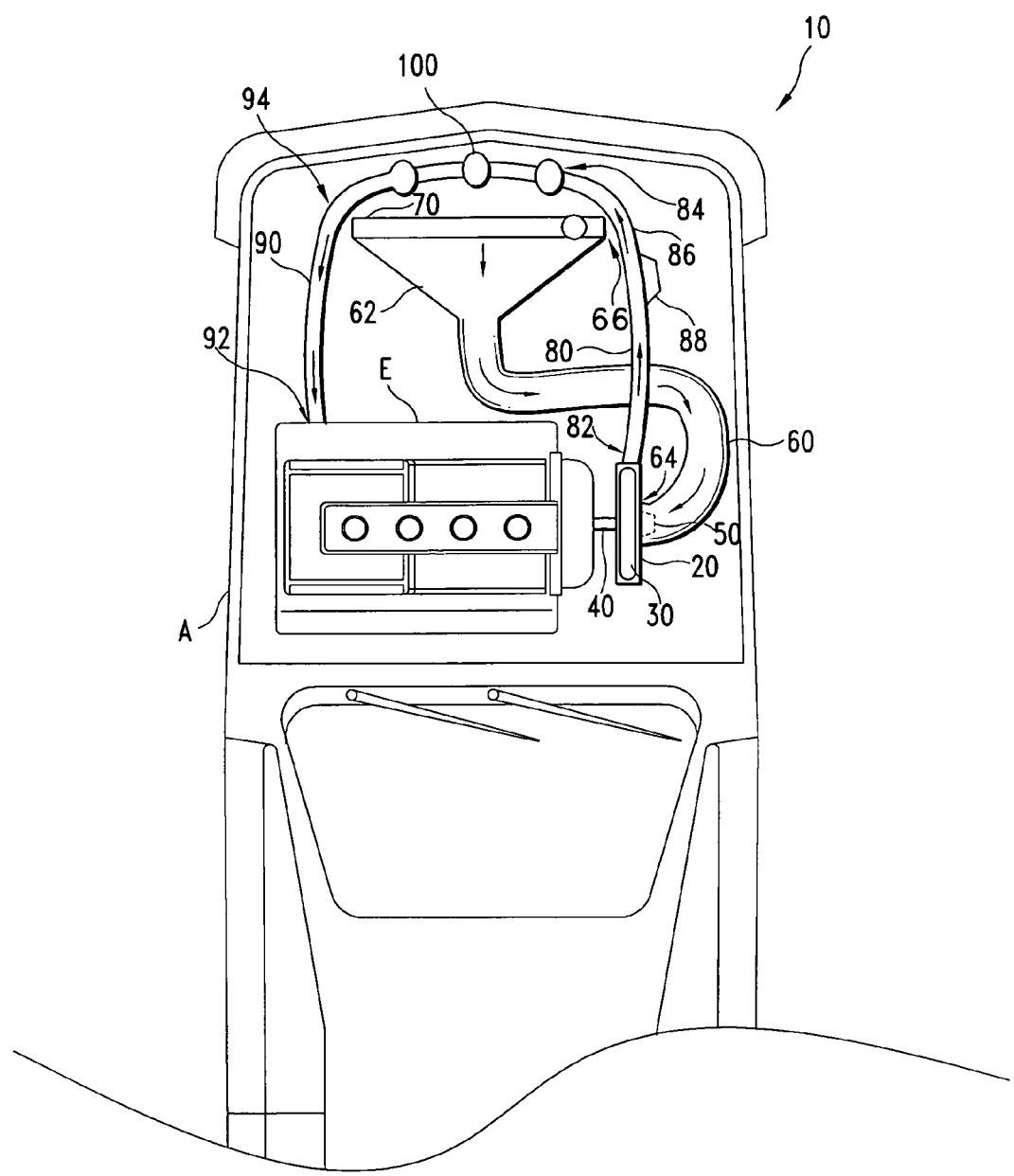
FIG. 1 is a diagrammatic top view of an automobile engine compartment with a radiator cooling fan replacement according to the present invention.

FIG. 1 depicts a top interior view of an automobile A with a radiator cooling fan replacement assembly 10. The radiator cooling fan replacement assembly 10 is secured to the output end of a conventional engine radiator 70. The radiator 70 generates air that is transferred to the engine block E. The radiator cooling fan replacement assembly 10 comprises a multi-stage centrifugal air pump 20, an air funnel 62, an air duct 60, an input valve 50, a pair of air pipes 80,90, a bypass valve 88 and an air-cooling filter 100. The arrows in FIG. 1 demonstrate the flow of air through the radiator cooling fan replacement assembly 10.

The air funnel 62 has a large top opening 66 attached to the radiator 70. The air funnel 62 transfers the output air from the radiator 70 through the air duct 60 towards the multi-stage centrifugal air pump 20. The air duct 60 is a hollow cylindrical tube with a top opening aligned with the air funnel 62 and a bottom opening 64 secured to the multi-stage centrifugal air pump 20.

Figure 3:
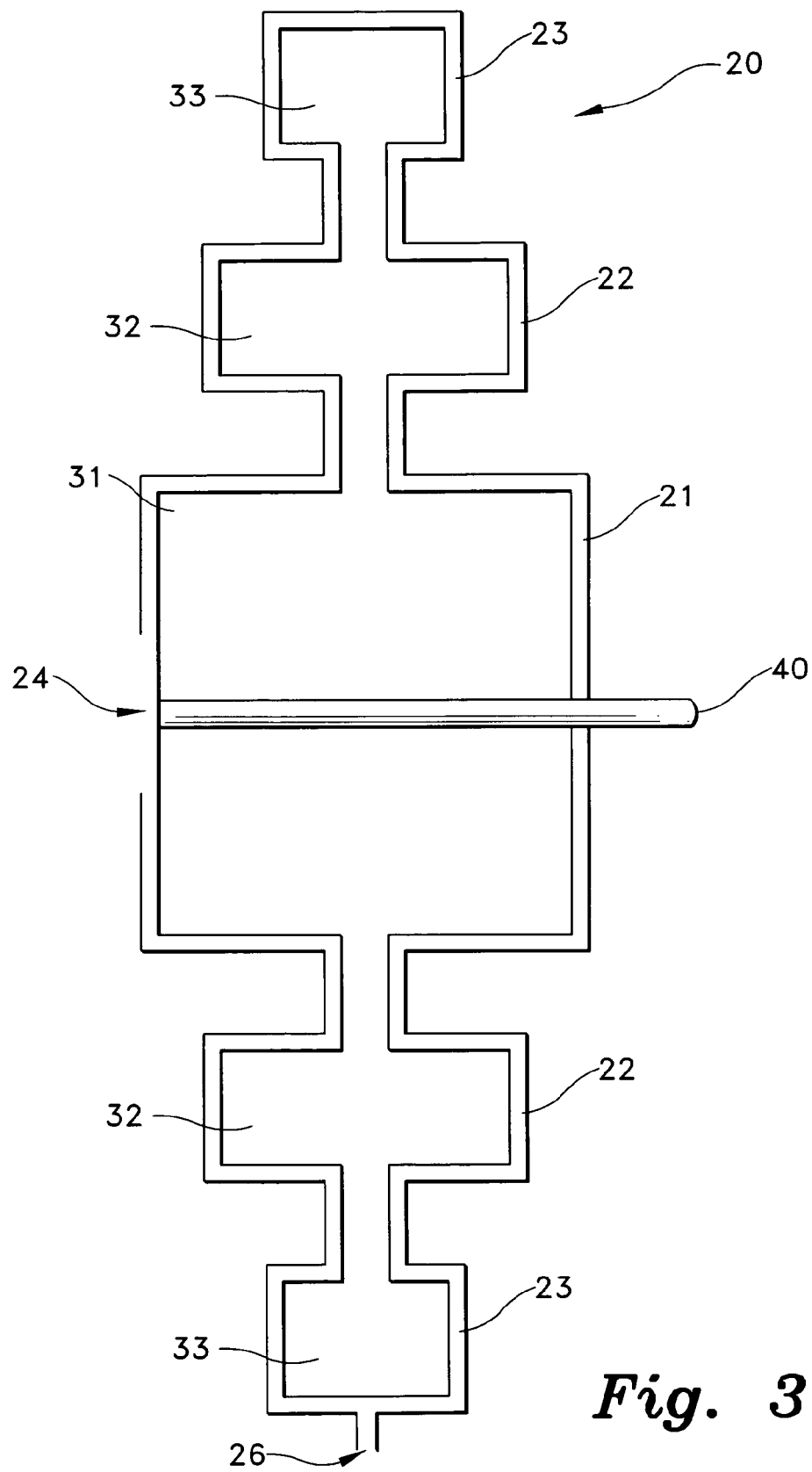
FIG. 3 is a cross-sectional view of the radiator cooling fan replacement.

The multi-stage centrifugal air pump 20 is a supercharger that simultaneously acts as a replacement for the radiator fan and increases the density of the air discharged by the radiator. The multi-stage centrifugal air pump 20 is secured to the rotating crankshaft 40 of the engine block E. FIG. 3 depicts a cross sectional view of the air pump 20. The air pump 20 comprises a plurality of adjacent radial air chambers 21,22,23. Each of the air chambers 21,22,23 are connected to adjacent air chambers by narrow air passages. The air pump 20 further comprises an intake opening 24 that is disposed along the rear wall of the air pump 20. The intake opening 24 is aligned with the bottom opening 64 of the air duct 60 and receives air transferred from the radiator 70 into the air pump 20.

Once air is sucked into the air pump 20 through the intake opening 24 it enters into the first air chamber 21. Inside the first air chamber 21 the air is contacted by the first set of rotating blades 31. The centrifugal force of the rotating blades 31 increases the density of the air. The air is then forced through a narrow air passage into the second air chamber 22, containing a second set of rotating blades 32. The density of the air is further increased while in the second air chamber 22. The air then moves into the third air chamber 23, containing a third set of rotating blades 33. The density of the air is further increased while in the third air chamber 23. After the air has passed through each of the air chambers it is forced out of an air outtake opening 26.

Figure 4:
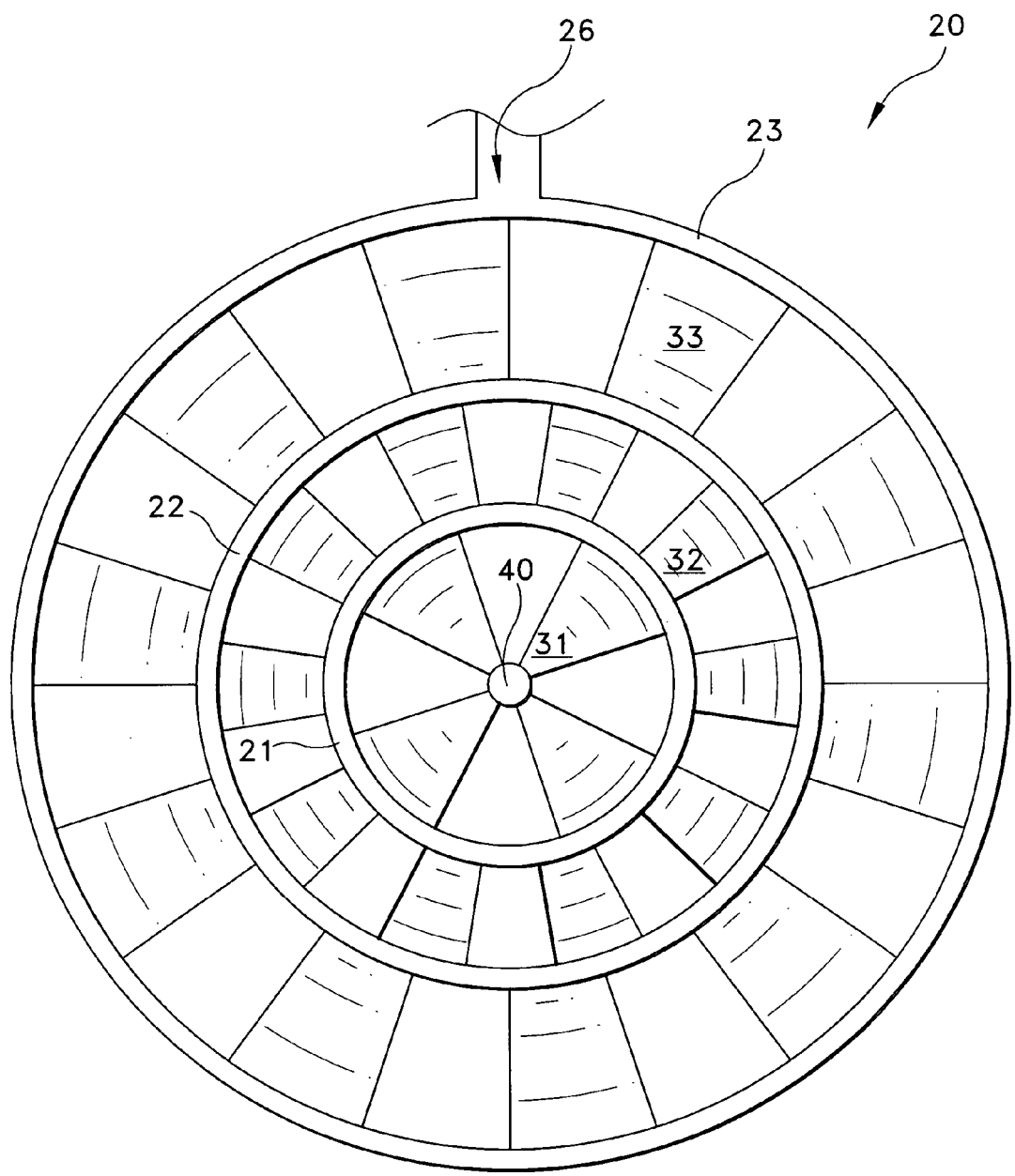
FIG. 4 is a front view of the radiator cooling fan replacement.

FIG. 4 depicts a front view of the multi-stage centrifugal air pump 20. Each air chamber contains an increasing number of rotating blades the farther the air chamber is positioned from the center of the air pump 20. The first air chamber 21, which is at the center of the air pump 20, contains the smallest number of rotating blades 22. The third air chamber 23 contains the largest number or rotating blades 33. Also, the rotation speed of the blades increases the farther from the center the air chamber is positioned. Therefore, the rotating blades 33 in the third air chamber 23 rotate at the highest speed. The increasing number of blades in each chamber coupled with the increasing speed of the blades results in a gradual increase of density of air as it travels from one air chamber to the next. This gradual increase in air density allows the air pump 20 to increase the density of air at lower rpm than with conventional turbochargers and superchargers.

Figure 5:
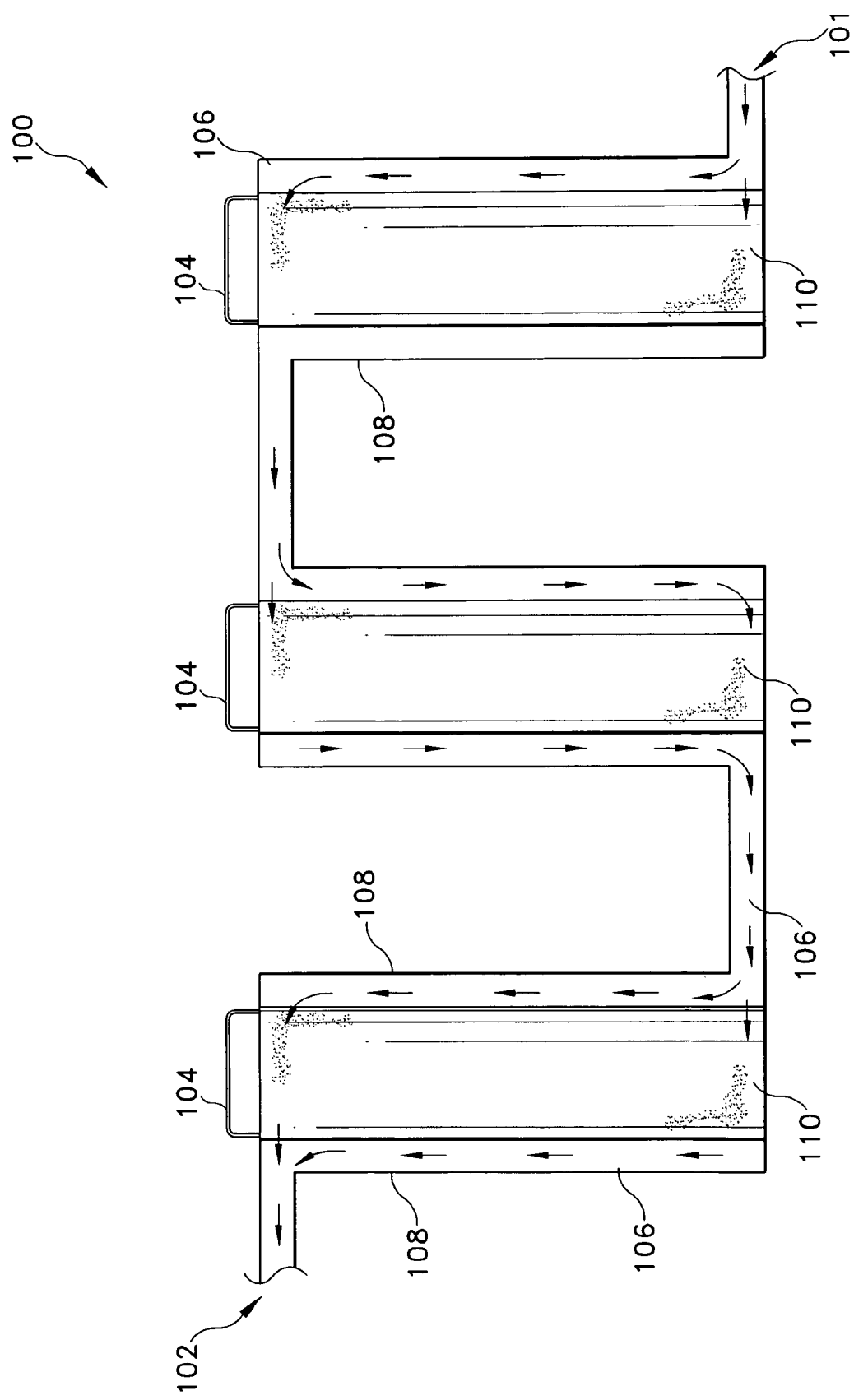
FIG. 5 is a cross-sectional view of an air-cooling filter.

Once the compressed air exits the air outtake 26 of the air pump 20 it enters into a first air pipe 80. The first air pipe 80 is attached at an input end 82 to the air pump 20 and at an output end 84 to the air-cooling filter 100. The first air pipe 80 transfers the air from the air pump 20 to the filter 100. FIG. 5 shows a cross sectional view of the filter 100. The air enters into the filter 100 through an input passage 101 and into a hollow metal tube 106. While inside the hollow metal tubes 106 the air passes through a plurality of removable layers of filter material 110. The layers of filter material 110 may be removed from the filter 100 by releasing the removable filter caps 104 and pulling out the filter material 110. The filter material 110 traps minor particles in the air to make the air safer for the engine. A plurality of cooling plates 108 are disposed on the exterior walls of the hollow tubes 106. The cooling plates 108 cool down the incoming air and further increase its density. The cooled air then passes through the air output passage 102 and exits the air filter 100. The arrows shown in FIG. 5 depict the path of the air as it moves through the air filter 100.

When the air exits the air filter 100 it enters into a second air pipe 90. The second air pipe has an input end 94, aligned with the output passage 102 of the air filter 100, and an output end 92 secured to the engine block E. The second air pipe 90 transfers the cooled air from the air filter 100 into the engine block E.

The radiator cooling fan replacement assembly 10 further comprises an input valve 50 and a bypass valve 88. Each valve is a solenoid magnetic valve that may be turned from an open position to a closed position. The input valve 50 is positioned at the intake opening 24 of the air pump 20. The bypass valve 88 is disposed along the first air pipe 80. The input valve 50 regulates the amount of air that passes into the air pump 20. The input valve 50 is regulated by a microprocessor that determines the appropriate amount of input air that is necessary in relation to the output demand and engine rpm.

The multi-stage air pump 20 will be active during the engine's crankshaft 40 rotation and will therefore increase the density of the air entering the engine block E. This will require more fuel to be injected into the engine E to maintain a proper fuel/air ratio. To avoid excessive consumption of fuel when there is no need for higher output, the bypass valve 88 will release air from the first air pipe 80 and the engine E will operate under normal induction. The input valve 50 and the bypass valve 88 will optimize the performance of the radiator cooling fan replacement assembly 10.

Figure 2:
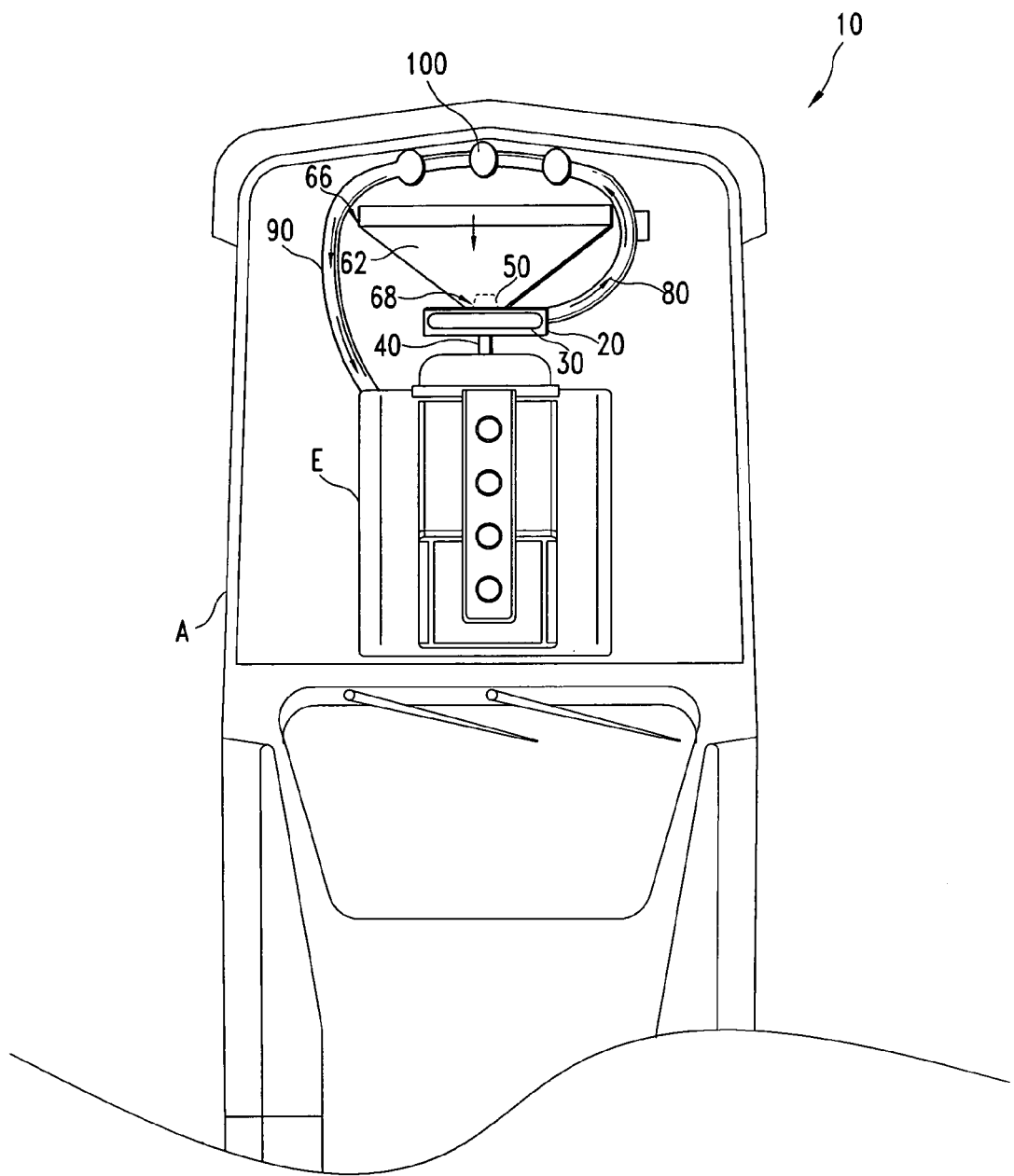
FIG. 2 is a diagrammatic top view of an automobile engine compartment depicting a second embodiment of the radiator cooling fan replacement.

FIG. 2 depicts a top interior view of an automobile with a radiator cooling fan replacement assembly 10 according to a second embodiment of the present invention. The present embodiment of the assembly 10 is used when there is limited space for the engine block E and the assembly 10. The present embodiment of the invention comprises generally the same elements and arrangement as the previous embodiment; however, the air duct has been removed from the assembly. In the present embodiment the funnel 62 is secured directly to the air pump 20 so that the air output from the radiator 70 flows directly into the air pump 20 through the funnel 62. The present embodiments of the invention are used for increasing the density of air in an internal combustion engine but the invention may also be used to supercharge other gases in other applications and by adding additional chambers to the air pump may also be used as an air or gas compressor.

It is to be understood that the present invention is not limited to the embodiments described above, but encompasses any and all embodiments within the scope of the following claims.

I claim:

1. A multi-stage centrifugal air pump, comprising:
   a housing disposed around a rotating shaft attached to the engine block on an automobile;
   a plurality of radial air chambers located inside of said housing, wherein each of said air chambers is connected by a narrow air passage;
   an air intake opening disposed along a first outer wall of said housing for allowing air to enter into said plurality of air chambers;
   an air outlet for allowing compressed air to exit said air pump and enter the engine block; and
   a plurality of rotating blades disposed in each of said plurality of air chambers;
   whereby air is sucked into a first of said air chambers through said air intake opening and the air is then transferred through each of said air chambers, the density of the air being increased as the air is transferred through each of said chambers.

2. A radiator cooling fan replacement assembly, comprising:
   a funnel, disposed along the output end of a radiator, having a large input end and a narrow output end;
   an air duct having an input end and an output end wherein said input end is secured to the output end of said funnel;
   a centrifugal air pump disposed along a rotating shaft of an engine block, said centrifugal air pump having a plurality of radial air chambers wherein each of said air chambers is connected by a narrow air passage, a plurality of rotating blades disposed inside of each air chamber, an air intake opening disposed along an outer wall of said air pump, wherein said air intake opening is aligned with the output end of said air duct, and an air outlet for allowing air to pass out of said centrifugal air pump;
   an air cooling filter for cooling the air leaving said air pump;
   a first air pipe for transporting air from said air pump to said air cooling filter;
   a second air pipe for transporting cooled air from said air cooling filter to the engine block;
   an air valve disposed along the intake opening of said air pump for regulating the amount of air that passes through the intake opening; and
   a bypass valve disposed along said first air pipe for regulating the amount of air that enters into said air cooling filter;
   whereby air is transported from said radiator to said centrifugal air pump and the density of the air is increased as it passes through said plurality of air chambers; and
   whereby air passes from said centrifugal air pump to said cooling air filter, which cools the air before it reaches the engine block.

* * * * *